(12) United States Patent
Kim

(10) Patent No.: US 6,246,921 B1
(45) Date of Patent: Jun. 12, 2001

(54) CONCENTRICITY PROCESSING APPARATUS USING VISION SYSTEM AND METHOD THEREFOR

(75) Inventor: Hyeon-Cheol Kim, Gumi (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/223,723

(22) Filed: Dec. 31, 1998

(30) Foreign Application Priority Data

Dec. 31, 1997 (KR) .................................... 97-82128

(51) Int. Cl.$^7$ ............................ G06F 19/00; G01B 11/10; G01N 21/86
(52) U.S. Cl. ...................... 700/159; 356/386; 250/559.19
(58) Field of Search ................................ 700/159; 356/2, 356/3.02, 4.01, 376, 386, 387; 250/559.19

(56) References Cited

U.S. PATENT DOCUMENTS

| | | | |
|---|---|---|---|
| 3,866,829 | * | 2/1975 | Egawa et al. .......................... 702/168 |
| 4,992,666 | * | 2/1991 | Robertson ............................. 250/561 |
| 5,044,088 | * | 9/1991 | Peucker ................................... 33/550 |
| 5,182,865 | * | 2/1993 | Greenslade ............................. 33/550 |
| 5,729,622 |   | 3/1998 | Andrei et al. . |
| 5,871,391 | * | 2/1999 | Pryor ........................................ 451/9 |
| 5,895,927 | * | 4/1999 | Brown ............................. 250/559.19 |
| 6,181,411 | * | 1/2001 | Harris et al. .......................... 356/4.01 |

FOREIGN PATENT DOCUMENTS

| | | |
|---|---|---|
| 58-143205 | 8/1983 | (JP) . |
| 61-221632 | 10/1986 | (JP) . |
| 61-292033 | 12/1986 | (JP) . |
| 2-268204 | 11/1990 | (JP) . |
| 5-277912 | 10/1993 | (JP) . |
| 6-174433 | 6/1994 | (JP) . |
| 8-128815 | 5/1996 | (JP) . |
| 9-105611 | 4/1997 | (JP) . |

* cited by examiner

Primary Examiner—William Grant
Assistant Examiner—Ronald D Hartman, Jr.
(74) Attorney, Agent, or Firm—Robert E. Bushnell, Esq.

(57) ABSTRACT

A concentricity processing apparatus and method employ a vision system to achieve precision-machining of products, even those having minute, tapered or complex-shaped inner diameters. The concentricity processing apparatus includes: a loading unit for loading the product or subject to be processed; a photographing unit for photographing the section of the subject to be processed as loaded into the loading unit; a display unit for displaying a section of the subject to be processed as photographed by the photographing unit; a controller for obtaining a concentricity value using at least two inside diameter values calculated by the display unit and at least two rotation angle values of the servo motor, and for calculating a machined amount in units of rotation angle with reference to the concentricity and the rotation angle corresponding thereto; a servo motor on which the loading unit is installed for rotating the loading unit by a rotation angle $\theta$ input from the controller; a processing tool for machining a subject to be processed as rotated by the servo motor; and an X-Y stage on which the processing tool is loaded for moving the processing tool in a horizontal direction according to the machined amount D calculated by the controller. According to the present invention, it is possible to overcome the requirements for precision processing of the product and to remove marginal numerical value requirements when a tail stock and a circular bar are used by directly fixing the outer diameter to a chuck without using the tail stock and the circular bar in fixing the product.

18 Claims, 4 Drawing Sheets

| ANGLE | θ₁ | θ₂ | θ₃ | · · · | θₙ |
|---|---|---|---|---|---|
| MACHINED AMOUNT | D₁ | D₂ | D₃ | · · · | Dₙ |

CONCENTRICITY PROCESSING APPARATUS USING VISION SYSTEM AND METHOD THEREFOR

CLAIM OF PRIORITY

This application makes reference to, incorporates the same herein, and claims all benefits accruing under 35 U.S.C. §119 from an application for *CONCENTRICITY PROCESSING APPARATUS USING VISION SYSTEM AND METHOD THEREFOR* earlier filed in the Korean Industrial Property Office on the Dec. 31, 1997 and there duly assigned Ser. No. 82128/1997.

BACKGROUND OF THE INVENTION

1. Technical Field

The present invention relates to a concentricity processing apparatus and method and, more particularly, to a concentricity processing apparatus and method for processing the concentricity of the outer diameter and the outer block of a ferrule for optical communication, a wire bonding capillary, and other minute inside diameters (200 μm).

2. Related Art

In general, concentricity is manually processed by inserting a pin or a wire into the minute inside diameter. More specifically, such techniques involve the fixing of the center of a product to be processed on a tail stock, or the insertion of a cylindrical pin into a hole corresponding to the inner diameter of the product. The product is then rotated and its outer diameter is machined.

However, there are at least two problems with such a technique: first, the scope of processing is limited in that products having a minute inner diameter, a tapered inner diameter or an inner diameter of complex shape cannot be processed; second, the level of precision is limited, and this is a problem when a pair of tail stocks which are not concentrically aligned is used.

SUMMARY OF THE INVENTION

To solve the above problems, it is an object of the present invention to provide a method for measuring concentricity which can be used for a processing apparatus.

It is another object of the present invention to provide a concentricity processing apparatus using a vision system and a method therefor which solve the above problems and increase processing precision and productivity.

Accordingly, to achieve the first object, there is provided a method for measuring concentricity in a vision system which comprises a motor for rotating a product or subject to be processed, a photographing unit for photographing a product or subject to be processed, and a display unit for displaying the photographed product or subject to be processed. The method comprises the steps of (a) loading a product or subject to be processed into loading means connected to the motor, (b) photographing the section of the loaded subject to be processed and displaying an inside diameter on the display means on the basis of the photographed section, (c) rotating the subject to be processed by a predetermined rotation angle using the motor, (d) photographing the section of the rotated subject to be processed and displaying the inside diameter on the display means, (e) obtaining a track of the inside diameter of the subject to be processed and displaying it on the display means by repeating the steps (c) and (d), and (f) obtaining a concentricity using the diameter of the track of the inside diameter.

To achieve the second object, there is provided a concentricity processing apparatus for processing the concentricity of a product or subject to be processed, comprising: a loading unit for loading the subject to be processed, photographing means for photographing the section of the subject to be processed loaded into the loading means, display means for displaying the section of the subject to be processed as photographed by the photographing means; a controller for obtaining a concentricity value using at least two inside diameter values calculated by the display means and at least two rotation angle values of the servo motor, and calculating a machined amount in units of Fuji each rotation angle with reference to the concentricity and the rotation angle corresponding thereto; a servo motor in which the loading means is installed for rotating the loading means by a rotation angle θ received as an input from the controller; a processing tool for machining the subject to be processed as rotated by the servo motor; and an X-Y stage in which the processing tool is loaded for moving the processing tool in a horizontal direction according to the machined amount D calculated by the controller.

The photographing means is, preferably, a CCD camera. The machined amount with respect to the concentricity is, preferably, half of the concentricity.

To achieve the second object, there is provided a method for processing the concentricity of a product or subject to be processed using a concentricity processing system which comprises: a photographing unit for photographing the subject to be processed; a display unit for displaying the subject to be processed as photographed by the photographing means; a motor for rotating the subject to be processed; and a processing tool for machining the subject to be processed. The method comprises the steps of loading the product or subject to be processed, photographing the section of the loaded subject to be processed, displaying the section of the photographed subject to be processed, obtaining a concentricity value using the motor rotation angle of the subject to be processed and the section of the displayed subject to be processed, calculating the rotation angles and the machined amounts of at least two motors using a rotation angle corresponding to the concentricity value and the concentricity value, and machining the subject to be machined by using the processing tool according to the machined amount, and by rotating a motor according to the calculated rotation angle.

BRIEF DESCRIPTION OF THE DRAWING(S)

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram showing the structure of a concentricity processing system;

FIG. 2A through 2C describe the processing principle of the concentricity processing system shown in FIG. 1;

DESCRIPTION OF THE PREFERRED EMBODIMENTS

Hereinafter, the present invention will be described in detail with reference to the attached drawings.

Figure 1:
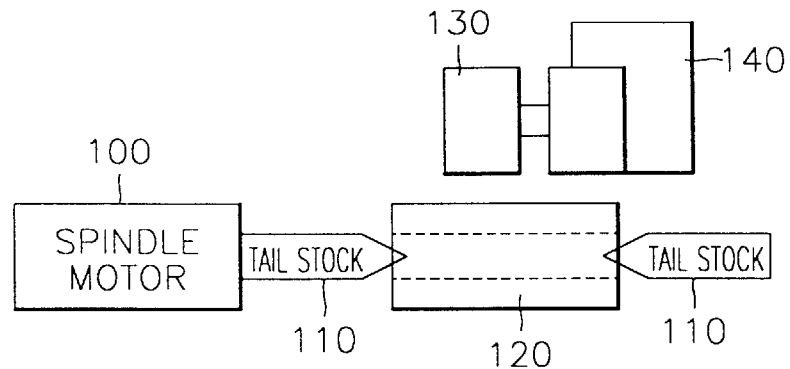

FIG. 1 is a block diagram showing the structure of a concentricity processing system. The center of a product 120 to be processed is fixed by a tail stock I 10 and the product 120 is rotated using a spindle motor 100. The product 120 is machined to be concentric using a processing tool 130. At that point, the processing tool 130 is loaded onto an X-Y stage 140 so as to move in a horizontal direction.

Figure 2A:
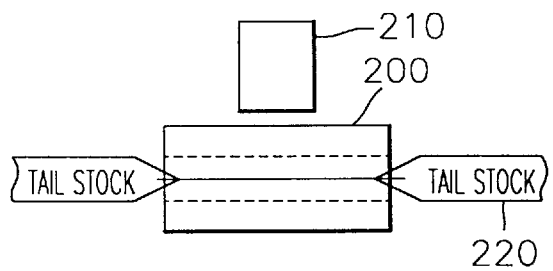
Figure 2B:
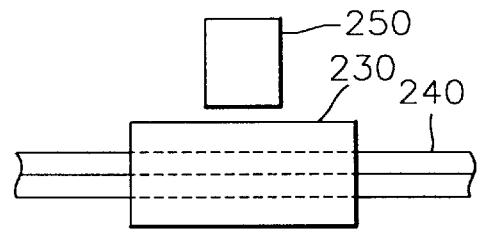
Figure 2C:
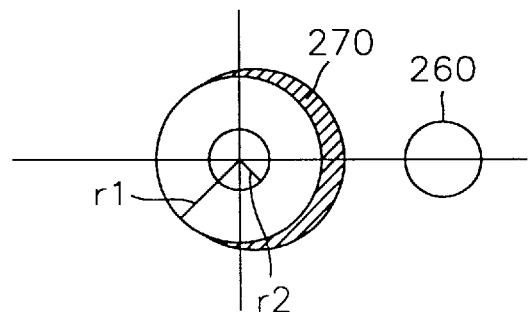

FIGS. 2A through 2C describe a processing principle of the concentricity processing system shown in FIG. 1. In a cylinder having an inside diameter, when the inside diameter is processed to be concentric with the outer diameter, a tail stock 220 having a precise center positioning degree is attached to the hole corresponding to the inside diameter (FIG. 2A), or a precisely processed cylindrical bar 240 is inserted into the hole corresponding to the inside diameter (FIG. 2B). Then, products 200 and 230 are rotated around the tail stock 220 and the cylindrical bar 240, respectively, and the outer diameter is machined using a polishing wheel or processing tool 210 and 250, respectively, Thus, the inside diameter is formed concentric with the outer diameter.

FIG. 2C is a sectional view of FIGS. 2A and 2B. Reference numerals 260, 270, rl, and r2 denote a processing tool, a machined portion, an outer diameter, and an inside diameter, respectively.

In carrying out the aforementioned processes, the following problems are caused. First, the processing scope is limited. A product having a minute inside diameter hole cannot be processed by the above method. Namely, the process cannot be performed when the hole of the inside diameter is so small that the tail stock 220 or the cylindrical bar 240 cannot be inserted therein. Also, if the inside diameter is tapered or has a complicated shape, the process is very difficult.

Figure 3:
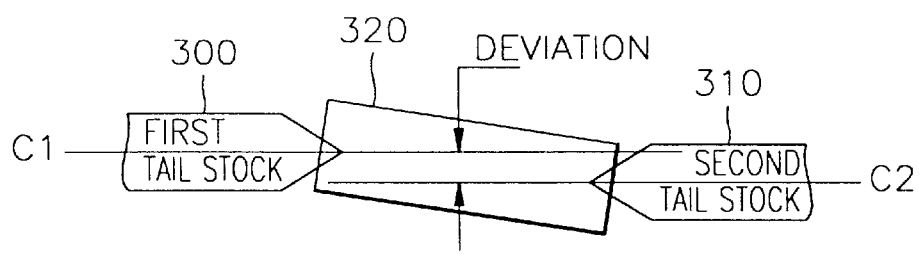
FIG. 3 shows a product in a case in which the center of a first tail stock does not coincide with the center of a second tail stock.
Figure 4:
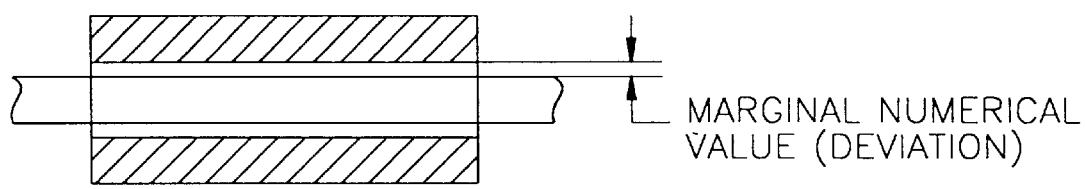
FIG. 4 shows a predetermined marginal numerical value required for inserting a cylindrical bar into an diameter.

Second, the level of precision is limited. Referring to FIG. 3, in the case of using two tail stocks, when the center of a first tail stock 300 and the center of a second tail stock 310 do not coincide, a problem is caused in processing a product 320. The center C1 of the first tail stock 300 should precisely coincide with the center C2 of the second tail stock 310. However, it is very difficult to make precise adjustments above a predetermined numerical value. Referring to FIG. 4, in the case of the cylindrical bar, there should be some margin of a predetermined numerical value in order to insert the cylindrical bar into the inside diameter. However, the center of the product can deviate by more than the marginal numerical value.

Figure 5:
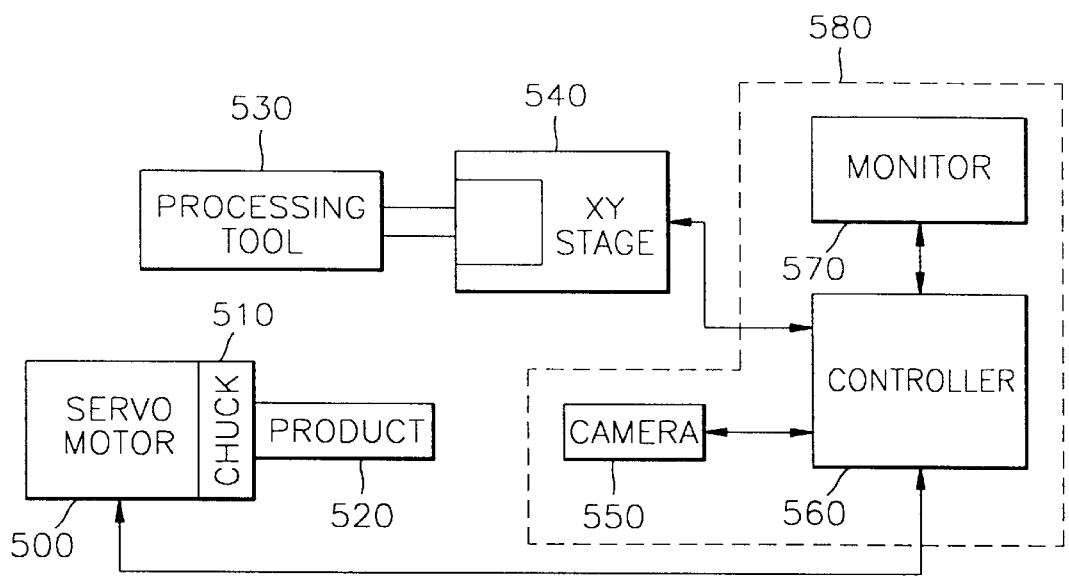
FIG. 5 is a block diagram showing the structure of a concentricity processing apparatus using a vision system according to the present invention.

FIG. 5 is a block diagram showing the structure of a concentricity processing apparatus using a vision system according to the present invention. The apparatus includes a servo motor 500, a chuck 510, a processing tool 530, an X-Y stage 540, and a vision system 580. The vision system 580 includes a camera 550, a controller 560, and a monitor 570.

The chuck 510 is mounted on the servo motor 500. Then, the chuck 510 is rotated by a rotation angle θ as input from the controller 560. When a predetermined rotation angle is input during the rotation, the chuck 510 rotates according to that rotation angle. The unit of the rotation angle can be controlled within a range of precision.

The chuck 510 serves as a means for loading the product (or subject to be processed) 520. The camera 550, which is preferably any suitable photographing means used for a general vision system, photographs the section of the product loaded on the chuck 510. Preferably, a CCD camera is used. The monitor 570 serves as a display means displaying the section of the subject to be processed as photographed by the camera 550. The length of the section of the photographed product is determined by the resolution ofthe monitor 570, and the resolution can be controlled. The vision system 580 obtains the concentricity value using at least two inside diameter values calculated from the controller 560 and at least two rotation angle values of the servo motor 500. The controller 560 includes a program for calculating the machined amount in units of each rotation angle with reference to the concentricity value and the rotation angle corresponding thereto. A computer having a vision board or display board is generally used as the controller 560.

A polishing wheel or a machining tool is used as the processing tool 530 for processing the product 520 as rotated by the servo motor 500. The processing tool 530 is loaded onto the X-Y stage 540. The X-Y stage 540 moves the processing tool 530 along a horizontal plane according to a machined amount D calculated by the controller 560. The operation of the present invention will now be described but, first, a method of measuring the concentricity value is described. The subject to be processed or product 520 is loaded onto the chuck 510 connected to the servo motor 500. The inside diameter is then displayed on the monitor 570 based on the center of the section by photographing the section of the product 520. Then, the product 520 is rotated by a previously set rotation angle using the servo motor 500. The rotation angle can be arbitrarily set by the user. For example, when the rotation angle is set to 500, the individual units of the set rotation angle are obtained by dividing 360° by 500. Then, the inside diameter is displayed on the monitor 570 based on the center of the section by photographing the section of the rotated product 520. When the processes of photographing the section and displaying the inside diameter are repeated for each unit of the set rotation angle, it is possible to display the track of the inside diameter of the subject to be processed or product 520 on the monitor 570. The track of the inside diameter is circular, and the diameter of the circle is concentric.

Figure 7:
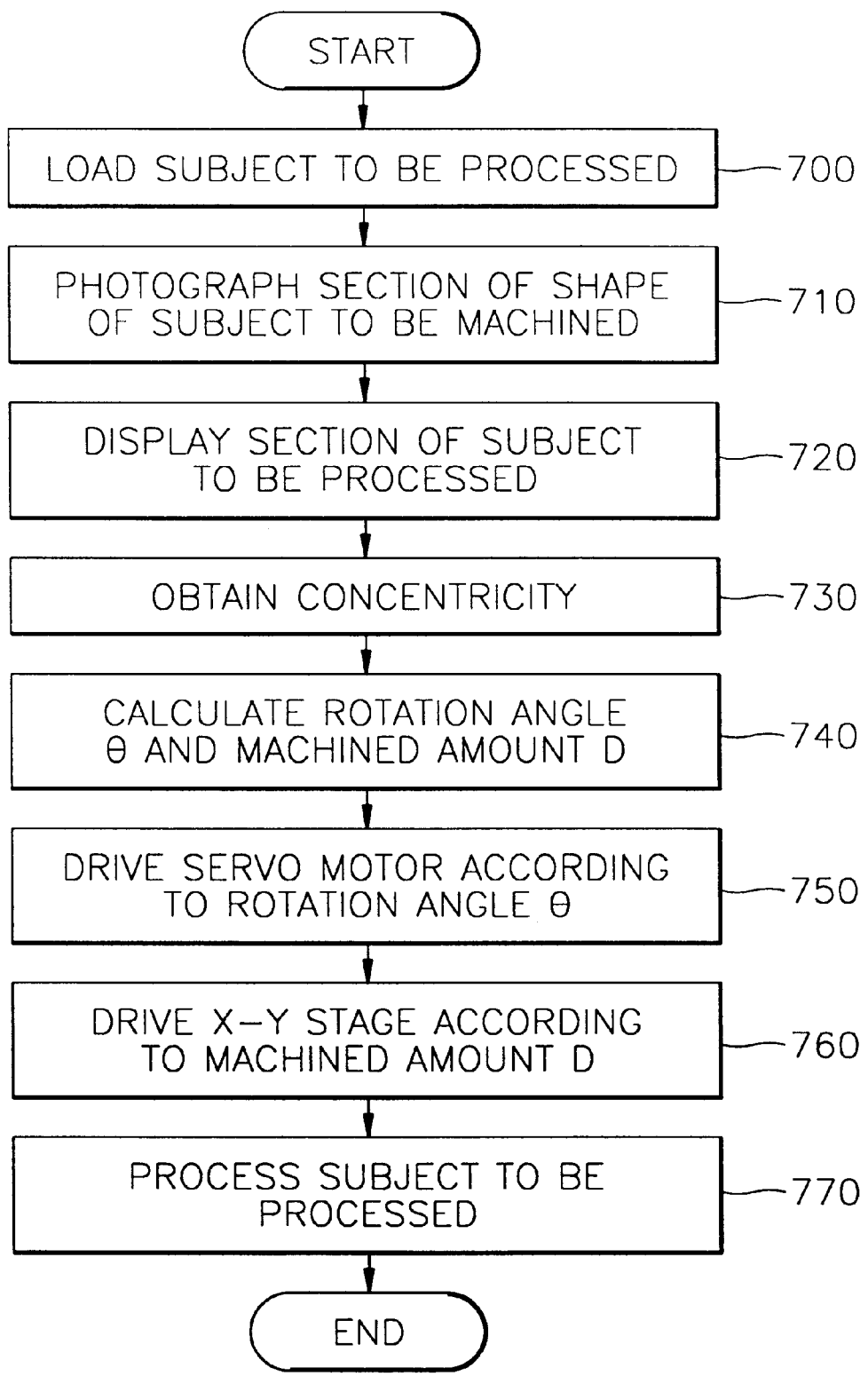
FIG. 7 is a flowchart showing the operation of a concentricity processing apparatus using a vision system.

FIG. 7 is a flowchart showing the operation of the apparatus for processing the concentricity using the vision system. The cylindrical product 520 having an inside diameter hole is loaded onto the chuck 510 (step 700). The CCD camera 550 photographs the shape of a section of the end of the loaded product 520 (step 710). The image data is transmitted to the monitor 570 through the controller 560, and monitor 570 displays the section ofthe product 520 on its screen (step 720). The controller 560 obtains the concentricity value using the above-mentioned method of measuring the concentricity (step 730). The controller 560 sets half of the concentricity as the maximum machined amount, an angle which differs by 180 ° from the rotation angle at that time is set as a reference rotation angle, and the machined amount D is obtained in units of a previously set rotation angle (step 740).

Figure 6:
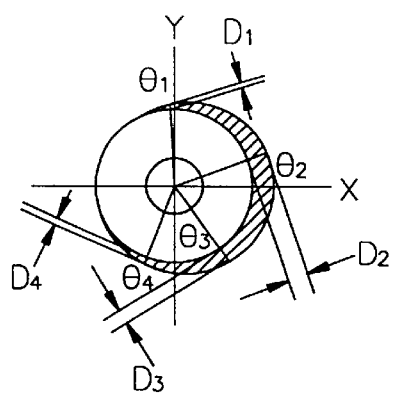
FIG. 6 shows the rotation angle of a servo motor and the amount of machined product corresponding thereto.

FIG. 6 shows the rotation angles and the machined amounts corresponding thereto. The unit of the rotation angle varies according to precision requirement; more precision is obtained as the rotation angle is smaller. The functional relation between the rotation angles and the machined amounts generally forms a sine wave. The machined amount corresponding to each rotation angle is calculated using a program previously stored in the controller 560 (FIG. 7).

The controller 560 rotates the chuck 510 by a given rotation angle θ by sending the value of the rotation angle θ generated by the program to the servo motor (step 750 of FIG. 6). The value of the machined amount D is sent to the X-Y stage 540 on which the processing tool 530 is loaded, and X-Y stage 540 controls the value of Y, thus controlling the machined amount (step 760). The tool is subjected to an automatic reciprocal motion in the direction of X by an additional signal. The concentricity of the outer diameter with respect to the inside diameter is automatically processed (step 770).

According to the present invention, it is possible to overcome the restrictions on processing precision of a product, and to remove marginal numerical value requirements when the tail stock and the circular bar are used by directly fixing the outer diameter to the chuck without using the tail stock and the circular bar in fixing the product.

Also, it is possible to process products having a minute inside diameter and tapered inside diameter. It is also possible to process products having a requirement for precise concentricity as to outer diameter, even if the inside diameter has the most minute hole since the concentricity of the outer diameter with respect to the inside diameter is automatically measured by fixing the product to the chuck, enlarging the minute hole by the vision system, displaying the minute hole on the monitor, executing a numerical control (NC) program using the measured value, and controlling the servo motor in accordance therewith. Thus, the present invention can be used for processing precision products in the field of optical communications and semiconductors.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for measuring concentricity of a product in a vision system which includes a motor for rotating the product, a photographing unit for photographing the product, and a display unit for displaying the photographed product, said method comprising the steps of:
   (a) loading the product onto a loading unit connected to the motor;
   (b) photographing a section of the loaded product and displaying an inside diameter on the display unit on the basis of the photographed section;
   (c) rotating the product in accordance with a predetermined rotation angle using the motor;
   (d) photographing the section of the rotated product and displaying the inside diameter on the display unit;
   (e) obtaining a track of the inside diameter of the product and displaying the track of the inside diameter on the display unit by repeating steps (c) and (d) for successive angles of rotation; and
   (f) obtaining the concentricity of the product using a diameter of the track of the inside diameter.

2. A concentricity processing apparatus for processing a concentricity of a product, said apparatus, comprising:
   loading means for loading the product;
   photographing means for photographing a section of the product as loaded onto said loading means;
   display means for displaying the section of the product as photographed by said photographing means;
   controller means for obtaining the concentricity of the product using at least two inside diameter values calculated by said display means and at least two rotation angle values;
   servo motor means connected to said loading means for rotating said loading means by a rotation angle input from said controller means, and for providing said at least two rotation angle values to said controller means;
   processing tool means for machining the products rotated by said servo motor means; and
   X-Y stage means on which said processing tool means is loaded for moving said processing tool means in a horizontal direction according to a machined amount calculated by said controller means;
   wherein said controller means uses the concentricity of the product to calculate the machined amount and a rotation angle corresponding thereto for a plurality of units of the rotation angle.

3. The apparatus of claim 2, wherein the photographing means comprises a CCD camera.

4. The apparatus of claim 2, wherein the machined amount is calculated to be one-half of the concentricity.

5. A method for processing a concentricity of a product to be processed using a concentricity processing system which includes a photographing unit for photographing the product, a display unit for displaying the product as photographed by the photographing unit, a motor for rotating the product, and a processing tool for machining the product, said method comprising the steps of:
   loading the product;
   photographing a section of the loaded product;
   displaying the photographed section of the loaded product;
   obtaining the concentricity using a motor rotation angle of the product and the displayed section of the loaded product;
   calculating rotation angles and corresponding machined amounts using a rotation angle input by a user and the obtained concentricity; and
   rotating the motor according to the calculated rotation angles and using the processing tool in accordance with the corresponding machined amounts to machine the product.

6. A method for measuring concentricity of a product having an inside diameter, said method comprising the steps of:
   photographing a section of the product and displaying the inside diameter on the basis of the photographed section;
   rotating the product by a predetermined rotation angle;
   photographing the section of the rotated product and displaying the inside diameter;
   obtaining a track of the inside diameter of the product and displaying the track of the inside diameter by repeating the rotating and photographing steps for successive rotation angles; and
   obtaining a concentricity of the product using a diameter of the track of the inside diameter.

7. An apparatus for measuring a concentricity of a product having an inside diameter, said apparatus comprising:
   photographing means for photographing a section of the product;
   rotating means for rotating the product by a rotation angle;

display means for displaying the inside diameter of the product on the basis of the photographed section of the product; and control means connected to said photographing means, said rotating means and said display means for controlling operations thereof;

wherein said control means controls said photographing means and said rotating means to phonograph the section of the product for various, successive rotation angles, and controls said display means to display the photographed sections of the product for the various, successive rotation angles, thereby generating a display of a track of the inside diameter of the product.

8. The apparatus of claim 7, wherein said control means obtains a concentricity of the product using at least two inside diameter values from said display means and at least two rotation angle values from said rotating means.

9. The apparatus of claim 8, wherein said control means calculates rotation angles and corresponding machined amounts based on a rotation angle input from a user and the obtained concentricity value.

10. The apparatus of claim 9, further comprising tool means for machining the product, as rotated by said rotating means, in accordance with the calculated rotation angles and the corresponding machined amounts.

11. The apparatus of claim 10, further comprising moving means connected to said tool means for moving said tool means according to corresponding machined amounts calculated by said control means.

12. The apparatus of claim 7, wherein said control means calculates rotation angles and corresponding machined amounts based on a rotation angle input from a user.

13. The apparatus of claim 12, further comprising tool means for machining the product, as rotated by said rotating means, in accordance with the calculated rotation angles and the corresponding machined amounts.

14. The apparatus of claim 13, further comprising moving means connected to said tool means for moving said tool means according to corresponding machined amounts calculated by said control means.

15. An apparatus for measuring a concentricity of a product having an inside diameter, said apparatus comprising:

photographing means for photographing a section of the product;

rotating means for rotating the product by a rotation angle;

displaying means for displaying the inside diameter of the product on the basis of the photographed section of the product; and control means connected to said photographing means, said rotating means and said display means for controlling operations thereof;

wherein said control means obtains a concentricity of the product using at least two inside diameter values from said display means and at least two rotation angle values from said rotating means.

16. The apparatus of claim 15, wherein said control means calculates said at least two rotation angles and corresponding machined amounts based on a rotation angle input from a user and the obtained concentricity value.

17. The apparatus of claim 16, further comprising tool means for machining the product, as rotated by said rotating means, in accordance with the calculated at least two rotation angles and the corresponding machined amounts.

18. The apparatus of claim 17, farther comprising moving means connected to said tool means for moving said tool means according to corresponding machined amounts calculated by said control means.

* * * * *